3,424,731
ACRYLONITRILE-VINYLIDENE CHLORIDE TERPOLYMERS
Alden Edward Blood, James Davis Heller, and Hugh J. Hagemeyer, Jr., Longview, Tex., assignors to Eastman Kodak Company, Rochester, N.Y., a corporation of New Jersey
No Drawing. Continuation-in-part of application Ser. No. 221,368, Sept. 4, 1962. This application Nov. 1, 1965, Ser. No. 505,973
U.S. Cl. 260—80.81    6 Claims
Int. Cl. C08f 15/40

ABSTRACT OF THE DISCLOSURE

Resinous terpolymers comprising vinylidene chloride, acrylonitrile and a polymerizable monomer selected from the group of vinyl 2,2-dimethylalkanoate, 2,2-dimethylbutyrate, and 2,2-dimethylhexanoate. Also disclosed is process of preparing the terpolymers.

---

This application is a continuation-in-part of my copending application Ser. No. 221,368, Blood et al., filed Sept. 4, 1962 now abandoned.

This invention relates to improved resinous vinylidene chloride terpolymers, and to a process for their preparation.

The new vinylidene chloride terpolymers of the invention have the following by weight composition ranges:

|  | Percent |
|---|---|
| Vinylidene chloride | 55–87 |
| Acrylonitrile | 10–40 |
| Third polymerizable monomer | 3–15 | that is, they contain recurring vinylidene chloride units, recurring acrylonitrile units and recurring monomeric units in the proportions above stated, the total of these units equalling 100% for any specific terpolymer of the invention.

However, we have found that not all polymerizable monomers are suitable as the third component. To produce the advantageous terpolymers of the invention, this third component must be one selected from a very limited group consisting of vinyl 2,2-dimethylalkanoates wherein the dimethylalkanoate group contains from 5–8 carbon atoms, e.g., vinyl 2,2-dimethylpropionate, vinyl 2,2-dimethylbutyrate, vinyl 2,2-dimethylhexanoate, etc., vinyl alkyl ethers wherein the alkyl group contains from 1–8 carbon atoms, e.g., vinyl methyl ether, vinyl butyl ether, vinyl 2,2-dimethylpropyl ether, vinyl 2,2-dimethylbutyl ether, etc., alkyl acrylates and methacrylates wherein the alkyl group contains from 1–8 carbon atoms, e.g., methyl acrylate, n-butyl acrylate, methyl methacrylate, n-propyl methacrylate, 2,2-dimethylpropyl acrylate, 2,2-dimethylbutyl acrylate, etc., and dialkyl fumarates and maleates wherein the alkyl group contains from 1–8 carbon atoms, e.g. dimethyl fumarate, di-n-butyl fumarate, di-2,2-dimethylbutyl fumarate, etc. and the corresponding maleates. As little as 3% and not more than 15% of these third components are efficacious in modifying and improving the properties of the resulting terpolymers. The particular branched chain third components are characterized by unusually good resistance to thermal degradation and hydrolysis as illustrated by the following Examples A and B.

Example A.—Thermal stability

The thermal stabilities of the terpolymers consisting of 30 percent acrylonitrile, 60 percent vinylidene chloride and 10 percent R (a vinyl ester), by weight based on total monomer were determined by placing compression-molded buttons 1 inch in diameter and ⅛ inch thick in an oven at 100° C. If after 1 hour no change was seen in the sample, the oven temperature was increased 20° C. When a sample showed evidence of change, it was removed and analyzed. If a sample showed no evidence of change and the temperature and time differences were significant considering all samples tested, the remaining sample was removed and examined. In the tables below, VP represents vinyl propionate, VB vinyl butyrate, VDB vinyl 2,2-dimethylbutyrate, and VI vinyl isobutyrate.

COMPARATIVE THERMAL STABILITY OF TERPOLYMERS
[30% AN/60% VCl₂/10% "R"]

| "R" | Total Exposure Time, hr. | Maximum Oven Temperature, °C. | Bar Softening Point, °C. | | Rockwell Hardness (R Scale) | | Color | |
|---|---|---|---|---|---|---|---|---|
| | | | Before | After | Before | After | Before | After |
| VP | 1 | 100 | 81 | 75 | 110 | 85 | Yellow | Brown. |
| VB | 1 | 100 | 85 | 80 | 110 | 83 | do | Do. |
| VDB | 4 | 160 | 90 | 88 | 112 | 105 | do | Yellow. |
| VI | 1 | 100 | 83 | 77 | 111 | 84 | do | Brown. |

Example B.—Hydrolytic stability

Comparisons of hydrolytic stability were made by immersing molded polymer buttons as described above in boiling 10 percent NaOH. Changes in appearance of the button evidence polymer degradation.

COMPARATIVE HYDROLYTIC STABILITY OF TERPOLYMERS
[30% AN/60% VCl₂/10% "R"]

| "R" | Hours in Caustic | Appearance |
|---|---|---|
| VP | 8 | Cracked. |
| VB | 8 | Do. |
| VDB | 16 | No change. |
| VI | 7.5 | Cracked-crazed. |

It is particularly noteworthy that the specific 2,2-dimethyl substitution as contrasted for example to the vinyl isobutyrate of the above examples or other alkyl substitutions results in striking improvements in thermal and hydrolytic stability. Such effects are quite unpredictable when compared to those obtained from other seemingly equivalent substitutions or when viewed in the light of teachings in the art.

If the given composition ranges are exceeded for any of the three specified components, the resulting product is brittle and has no strength. The softening point can be varied from about 60–95° C. by varying the acrylonitrile content. The products containing the higher percentage of acrylonitrile have the highest softening point and, conversely, the lower percentages of acrylonitrile give products having the lower softening points. Terpolymers containing less than the specified 10% of acrylonitrile are too soft, while those containing more than 40% of acrylonitrile become more insoluble, the acetone solubility being practically negligible at the higher acrylonitrile concentrations. However, all of the products of the invention have high strength and stiffness, provided the above specified composition ranges are not exceeded. Those vinyl 2,2-dimethylalkanoate-containing terpolymers have particularly useful properties and are preferred.

The resinous terpolymers of the invention above defined have the following combination of properties:

(1) High strength and toughness.
(2) Very high stiffness.
(3) Films of excellent flexibility.
(4) Very high hardness.
(5) Low softening points.
(6) Acetone solubility.
(7) Good low temperature properties.
(8) Impervious to water vapor.

This combination of properties permits coatings to be made therefrom onto paper, fabrics and other temperature-sensitive materials. The coated articles are strong, flexible and impervious to water vapor. Such coatings can be made from emulsions or solutions of the terpolymers. Also, the low softening points permit the coatings to be heat set so as to form firm bonds to the support material. Sheets and molded articles can also be prepared which are tough and very strong and rigid.

In contrast to the above, compositions containing only vinylidene chloride and acrylonitrile, or vinyl chloride and acrylonitrile, or compositions containing acrylonitrile, vinylidene chloride and a different third compatible monomer outside of the composition limits of the invention, are brittle and weak and wholly unsuited for coating or making sheet and molded articles. None of the compositions previously described in the prior art have the unique combination of properties possessed by the terpolymer compositions of the invention.

It is, accordingly, an object of the invention to provide new resinous, acetone-soluble vinylidene chloride terpolymers having softening points from about 60–95° C. Another object is to provide coating and molding compositions of the same. Another object is to provide shaped articles therewith. Other objects will become apparent from the description and examples.

In accordance with the invention, we prepare the resinous terpolymers of the invention as above defined by copolymerizing a mixture comprising from 55–87% by weight of vinylidene chloride, from 10–40% by weight of acrylonitrile and from 3–15% by weight of one or more of the mentioned third polymerizable monomers, in the presence of a conventional polymerization catalyst. Heat and actinic light such as ultraviolet radiation also accelerate the reaction. Any method known to the art can be used, for example, polymerization in mass, suspension, emulsion, solution, etc. Suitable polymerization catalysts includes peroxides such as hydrogen peroxide, benzoyl peroxide, acetyl peroxide, lauroyl peroxide, di-tert-butyl peroxide, etc., persulfates such as ammonium, sodium and potassium persulfates, perborates such as sodium and potassium perborates, persulfinic acid, water-soluble salts of sulfo-per-acids (e.g. Caro's acid), and the like. Other catalysts such as boron trifluoride, azines, ketazines, etc. can also be used. Mixtures of these catalysts may be employed, if desired. The total amount of catalyst can vary from about 0.1 to 3%, based on the weight of the monomers to be polymerized. The temperature of the reaction can vary widely, but preferably about from 30–125° C. Normal or higher than atmospheric pressures can be used. Advantageously, the reactions can be carried out under an inert atmosphere, e.g., under nitrogen. For emulsion polymerizations any nonsolvent can be employed, water being especially advantageous. The monomers can be emulsified in water using emulsifying agents such as salts of higher fatty acids, e.g. sodium or potassium stearate, palmitate, etc., or ordinary soaps, or salts of higher fatty alcohol sulfates, e.g. sodium or potassium lauryl sulfate, sodium or potassium di(2-ethylhexyl) sulfosuccinate, sodium or potassium cetyl sulfate, sodium or potassium stearyl sulfate, etc., or salts of aromatic sulfonic acids, e.g. sodium or potassium salts of alkylnaphthalene sulfonic acids, higher molecular weight quaternary ammonium salts, e.g. dimethyl benzylphenyl ammonium chloride, and the like. If desired, an activating agent can be added such as an alkali metal bisulfite, e.g. sodium or potassium bisulfite, in about similar amount as the catalyst. Also, chain regulators such as alkyl mercaptans, e.g. lauryl mercaptan, can be further added with advantage to the mixture. The terpolymeric products produced as above described are then isolated from their polymerization reaction mixtures by conventional separation means for polymers, for example, by precipitation, coagulation, filtration, etc. In general, the terpolymer compositions are approximately the same as the monomer composition charged over a wide range of conversions.

The above-mentioned monomeric vinyl 2,2-dimethylalkanoates may be prepared by the general method described by R. R. Adelman, J. Org. Chem. 14, 1057–77 (1949); the 2,2-dimethylalkyl acrylates and methacrylates by the general method of J. W. Crawford, J. Soc. Chem. Ind., 68, 201–208 (1949); and the vinyl 2,2-dimethylalkyl ethers by the method described in our copending application Ser. No. 184,493, filed Apr. 2, 1962.

The following examples will serve to illustrate further the terpolymers of the invention, and the manner of preparing the same.

Examples 1–13

These examples were carried out by emulsion polymerization technique. The procedure used with Example 1 is described below in detail. All of the other examples were carried out in the same way with appropriate reactant and concentration changes. The results are all tabulated in the table following the detailed example.

In a 450-ml. Parr pressure vessel were charged 180 ml. of distilled water, 5.9 g. of acrylonitrile, 34.0 g. of vinylidene chloride, 2.0 g. of vinyl 2,2-dimethylhexanoate, 2.2 g. of Duponol ME (a fatty alcohol sulfate), 0.1 g. of sodium bisulfite, 0.8 g. of sodium persulfate, 3 drops of dodecyl mercaptan and 5 drops of trimethylamine solution in water. The air was displaced with nitrogen and the bottle was heated at 60° C. with shaking for 24 hours. The resulting emulsion was precipitated with saturated sodium chloride solution. The precipitated polymer was washed with water and methanol, and then dried at 40° C. under vacuum. The yield of polymer was 35.1 g., or a conversion to polymer of 85.5%. Analysis of this polymer for chlorine and nitrogen contents indicated from these results that it was a terpolymer of the composition listed in Table 1 below. A button made from 1.0 g. of the above terpolymer using a mold temperature of 160° C. was light yellow in color, acetone-soluble, and extremely tough and strong and hard. The softening point (S.P. in the table) was found to be 62° C. as measured on a melting point bar.

TABLE 1.—TERPOLYMER COMPOSITION, WEIGHT PERCENT

| Example No. | AN | V₁Cl₂ | Third Monomer | Conver., Percent | Physical Description | S.P., °C. |
|---|---|---|---|---|---|---|
| 1 | 12.5 | 82.7 | Vinyl 2,2-dimethylhexanoate, 4.8 | 85.5 | Tough | 62 |
| 2 | 27.6 | 66.5 | Vinyl 2,2-dimethylbutyrate, 5.9 | 78.0 | Very tough | 86 |
| 3 | 33.3 | 58.4 | Vinyl 2,2-dimethylbutyrate, 8.3 | 83.6 | Tough | 91 |
| 4 | 33.0 | 60.0 | 2,2-dimethyl acrylate, 7.0 | 91.3 | do | 93 |
| 5 | 32.2 | 61.2 | Vinyl 2,2-dimethylbutyl ether, 6.6 | 81.6 | do | 85 |
| 6 | 28.8 | 58.4 | Vinyl 2,2-dimethylbutyrate, 12.8 | 83.0 | Very tough | 80 |
| 7 | 30.1 | 63.2 | Methyl methacrylate, 6.7 | 92.0 | do | 94 |
| 8 | 22.0 | 74.8 | Dibutyl maleate, 3.2 | 82.1 | Tough | 83 |
| 9 | 63.2 | 22.6 | Vinyl 2,2-dimethylbutyrate, 14.2 | 79.0 | Brittle | 110 |
| 10 | 44.7 | 44.7 | Vinyl 2,2-dimethylbutyrate, 10.6 | 80.0 | do | 98 |
| 11 | 16.3 | 56.2 | Vinyl 2,2-dimethylbutyrate, 27.5 | 80.0 | do | 64 |
| 12 | 8.0 | 82.0 | Methyl methacrylate, 10.0 | 61.0 | Weak | 60 |
| 13 | 45.5 | 54.5 | None | 80.0 | Brittle | |

By inspection of the results listed in above Table 1, it will be seen that Examples 1–8, which illustrate the invention over the specified composition ranges, all give strong, hard and tough terpolymer products, whereas Examples 9–12 whose compositions are clearly outside the specified composition limits of the invention give only weak and brittle buttons or articles. Example 13 shows that the third monomer is necessary to obtain a tough, strong polymer.

Examples 14–15

Two large scale polymerizations were carried out in a one-gallon autoclave to obtain enough product for more complete property evaluation. The runs were carried out by the general process described in Example 1 with the obvious necessary changes. The products and their properties are described in the following Table 2.

TABLE 2

|  | Example 14 | Example 15 |
| --- | --- | --- |
| Polymer Comp., by wt.: |  |  |
| Percent Acrylonitrile | 34.5 | 28.7 |
| Percent Vinylidene Chloride | 58.5 | 66.5 |
| Percent VC₆ ester [1] | 7.0 | 4.8 |
| Bar Softening Point, °C | 90.0 | 78.0 |
| Vicat Softening Point, °C | 79.6 | 66.6 |
| Tensile Strength, p.s.i. | 5,400 | 2,950 |
| Brittleness Temp., °C | 32 | 32 |
| Stiffness in Flexure, p.s.i. | 439,100 | 404,700 |
| Rockwell Hardness, R Scale | 113 | 101 |
| Izod Impact, ft. lbs./in. of notch | 0.68 | 0.43 |
| Acetone Solubility, 30% conc. | (²) | (²) |

[1] Vinyl 2,2-dimethylbutyrate.
[2] Soluble.

These properties (listed in above Table 2) show the unique combination of high tensile strength, good impact strength, extremely high stiffness, high hardness, low softening point and acetone solubility. It is to be noted that these properties were measured at a temperature below the brittle temperature. Thus, the properties are little affected at lower temperatures.

Other generally similar terpolymers of the invention may be prepared by substituting into the above examples any of the mentioned suitable third components such as, for example, vinyl 2,2-dimethylpropionate, vinyl 2,2-dimethylpentanoate, 2,2-dimethylpropyl ether, 2,2-dimethyl methacrylate, n-butyl acrylate, n-butyl methacrylate, etc. While the examples have illustrated only molded buttons prepared from the terpolymers of the invention, it will be understood that other molded articles, and coatings, films and sheets of similarly advantageous properties can only be made therefrom. Solutions and compositions of the terpolymers may also have incorporated therein, if desired, other materials such as fillers, pigments, dyes, etc., to give added effects and utility to the coatings and articles produced with these terpolymers.

What we claim is:

1. A resinous terpolymer of (1) from 55–87% by weight of vinylidene chloride, (2) from 10–40% by weight of acrylonitrile and (3) from 3–15% by weight of a vinyl, 2,2-dimethylalkanoate wherein the said dimethylalkanoate group contains from 5–8 carbon atoms, the total of said (1), (2) and (3) being equal to 100%.

2. A resinous terpolymer of (1) from 55–87% by weight of vinylidene chloride, (2) from 10–40% by weight of acrylonitrile and (3) from 3–15% by weight of vinyl 2,2-dimethylbutyrate, the total of said (1), (2) and (3) being equal to 100%.

3. A resinous terpolymer of (1) from 55–87% by weight of vinylidene chloride, (2) from 10–40% by weight of acrylonitrile and (3) from 3–15% by weight of vinyl 2,2-dimethylhexanoate, the total of said (1), (2) and (3) being equal to 100%.

4. A process for preparing a resinous terpolymer of vinylidene chloride, acrylonitrile and a vinyl 2,2-dimethylalkanoate which comprises heating at a temperature of from 30–125° C. and in the presence of a peroxide polymerization catalyst, a mixture containing as the sole polymerizable components (1) from 55–87% by weight of vinylidene chloride, (2) from 10–40% by weight of acrylonitrile and (3) from 3–15% by weight of a vinyl 2,2-dimethylalkanoate, wherein the said dimethylalkanoate group contains from 5–8 carbon atoms.

5. A process for preparing a resinous terpolymer of vinylidene chloride, acrylonitrile and vinyl 2,2-dimethylbutyrate which comprises heating at a temperature of from 30–125° C. and in the presence of a peroxide polymerization catalyst, a mixture containing as the sole polymerizable components (1) from 55–87% by weight of vinylidene chloride, (2) from 10–40% by weight of acrylonitrile and (3) from 3–15% by weight of vinyl 2,2-dimethylbutyrate.

6. A process for preparing a resinous terpolymer of vinylidene chloride, acrylonitrile and vinyl 2,2-dimethylhexanoate which comprises heating at a temperature of from 30–125° C., a mixture containing as the sole polymerizable components (1) from 55–87% by weight of vinylidene chloride, (2) from 10–40% by weight of acrylonitrile and from 3–15% by weight of vinyl 2,2-dimethylhexanoate.

References Cited

UNITED STATES PATENTS 2,605,254   7/1952   Wolf _____ 260—7.85
2,278,415   4/1942   Arnold _____ 260—87.7 XR JOSEPH L. SCHOFER, Primary Examiner.

J. KIGHT III, Assistant Examiner.

U.S. Cl. X.R.

260—78.5, 80.6, 85.5, 87.7